United States Patent [19]

Nishiyama

[11] 4,158,484

[45] Jun. 19, 1979

[54] REFLECTIVE TYPE LIQUID CRYSTAL DISPLAY

[75] Inventor: Mitsuru Nishiyama, Nara, Japan

[73] Assignee: Sharp Kabushiki Kaisha, Osaka, Japan

[21] Appl. No.: 829,423

[22] Filed: Aug. 31, 1977

[30] Foreign Application Priority Data

Aug. 31, 1976 [JP] Japan .............................. 51-105138

[51] Int. Cl.² .............................................. G02F 1/13
[52] U.S. Cl. .................................... 350/338; 350/339
[58] Field of Search ............................... 350/338, 339

[56] References Cited
U.S. PATENT DOCUMENTS 3,814,501  6/1974  Schindler ............................. 350/338

Primary Examiner—Edward S. Bauer
Attorney, Agent, or Firm—Birch, Stewart, Kolasch and Birch

[57] ABSTRACT

In a reflective type liquid crystal display comprising a rear support plate carrying segmented reflective electrodes in a predetermined display region, a front transparent support plate carries first and second reflective coatings in a region except the region corresponding to said segmented reflective electrodes, and a transparent electrode is deposited on said front support plate and said second reflective coating. An intermediate layer of insulator material is interposed between said first and second reflective coatings. Said intermediate layer protects the first reflective coating from the influence caused by the chemical reaction between said transparent electrode and said second reflective coating.

3 Claims, 3 Drawing Figures

REFLECTIVE TYPE LIQUID CRYSTAL DISPLAY

BACKGROUND OF THE INVENTION

The present invention relates to a liquid crystal display, and more particularly, to a reflective type liquid crystal display.

As is well known in the art of displays, the reflective type of liquid crystal displays is that which contains a liquid crystal composition sandwiched between a reflector electrode bearing rear support plate and a transparent electrode bearing front support plate and provides a visual display of desired symbols by a change in the optical characteristics of the liquid crystal composition, for example, the so-called dynamic scattering effects caused by voltage selectively applied across both electrodes, namely, a variation in a contrast ratio in reflected light in the dynamic scattering.

The results of the inventor's investigation have revealed that the reflective type liquid crystal display of the prior art still faces the following problem. The aluminium reflective coating causes to the collapse of the reflective characteristics, that is, the reduction of the reflective coefficient is unavoidably created through pin holes developed within the aluminium reflective coating. The pin holes are generated through the local cell between the aluminium reflective coating and the indium oxide layer.

OBJECTS AND SUMMARY OF THE INVENTION

Accordingly, one object of the present invention is to provide an improved reflective type liquid crystal display capable of making a display of high visibility.

Another object of the present invention is to provide an improved reflective type liquid crystal display which eliminates the collapse of the reflective characteristics caused by the generation of pin holes.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the sprit and scope of the invention will become apparent to those skilled in the art from this detailed description.

To achieve the above objects pursuant to an embodiment of the present invention, the reflective layers comprise at least two layers which sandwich an intermediate layer of insulator material to protect a first reflective coating from the influence caused by the chemical reaction between a transparent electrode and a second reflective coating maintained in contact with the transparent electrode.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
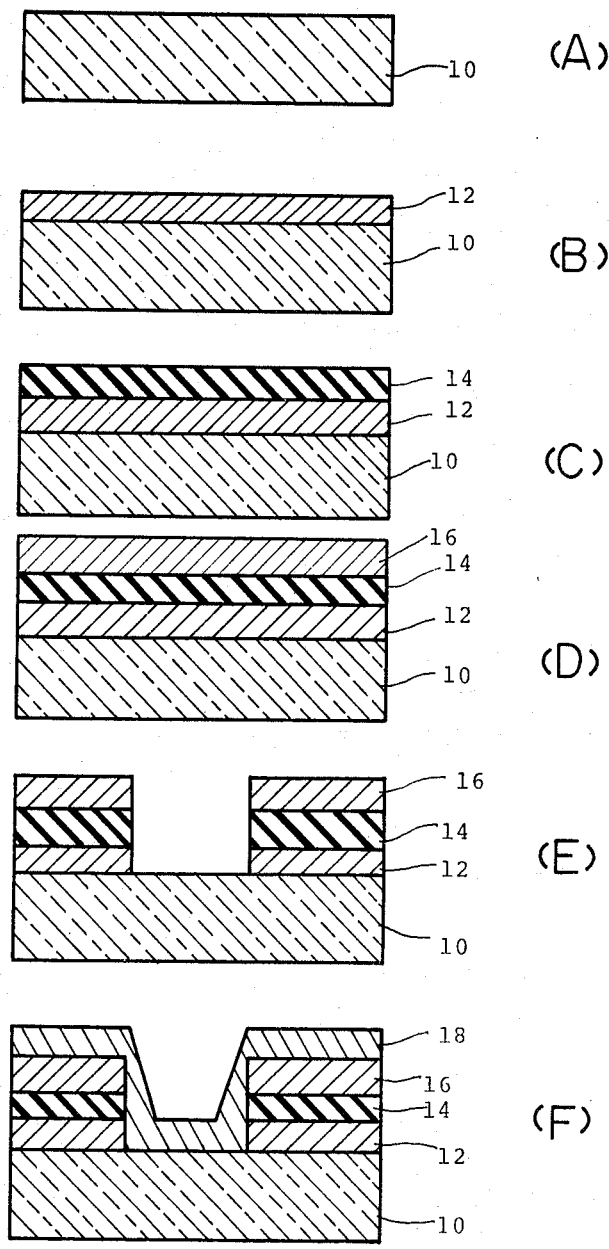
FIGS. 1(A) through 1(F) are sectional views showing a manufacturing process of an embodiment of a reflective type liquid crystal display of the present invention.

The present invention will be described in detail with reference to a particular embodiment, in which the reflective layer comprise at least two layers, said reflective layers sandwiching an intermediate layer of insulator material to resist the distribution of a local cell between a reflective layer and a transparent electrode.

FIGS. 1(A) through 1(F) are the sectional views showing a manufacturing process of an embodiment of a reflective type liquid crystal display of the present invention.

A front glass support plate 10 shown in FIG. 1(A) is cleaned up. A first reflective coating 12 made of aluminum is formed through the use of evaporation techniques or sputtering techniques on the front support plate 10 as shown in FIG 1(B). The thickness of the first reflective coating 12 is about 1200 Å. The surface of the first reflective coating 12 is oxidized by exposing it to the atmosphere for two hours, thereby forming an aluminium oxide film 14 of several hundred Å on the first reflective coating 12 as shown in FIG. 1(C). A second reflective coating 16 of aluminum is further formed on the alminum oxide film 14 through the use of evaporation techniques or sputtering techniques as illustrated in FIG. 1(D). The thickness of the second reflective coating 16 is about 1200 Å. The portions corresponding to segmented reflective electrodes on a rear support plate are etched as shown in FIG. 1(E). A transparent electrode 18 of indium oxide is formed on the second reflective coating 16 and the front support plate 10 through the use of evaporation techniques as shown in FIG. 1(F).

Figure 2:
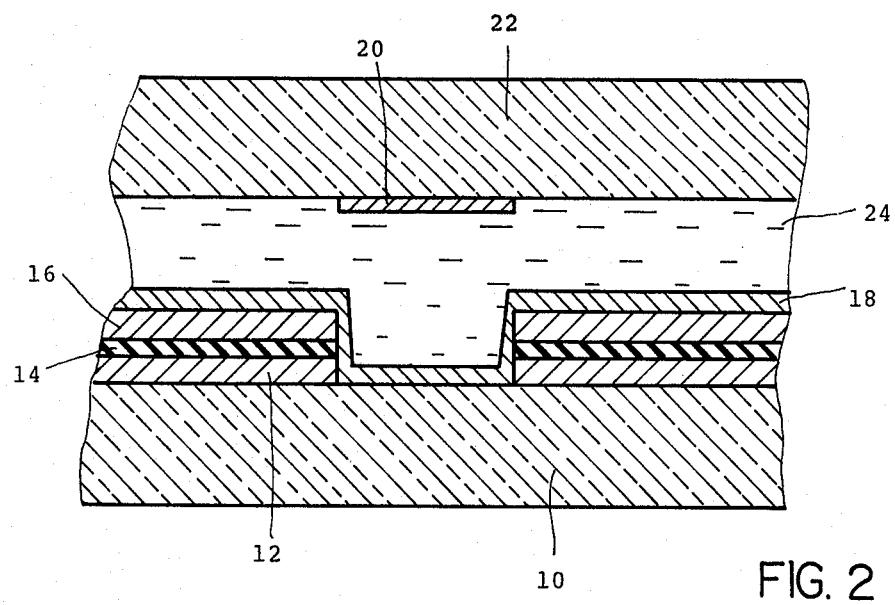
FIG. 2 is a sectional view of an embodiment of the reflective type liquid crystal display of the present invention.

FIG. 2 shows the reflective type liquid crystal display manufactured through the process shown in FIG. 1, wherein there is formed a segmented reflective electrode 20 of aluminum having a predetermined display pattern on a rear support plate of glass 22. The transparent electrode 18 of indium oxide is spaced against the segmented reflective electrode 20.

The first and second reflective coatings 12 and 16 of aluminum are deposited on the region except that region corresponding to the segmented reflective electrode 20. A liquid crystal composition 24 is injected between the two electrodes 18, 20 and held there with the aid of spacer members (not shown).

Figure 3:
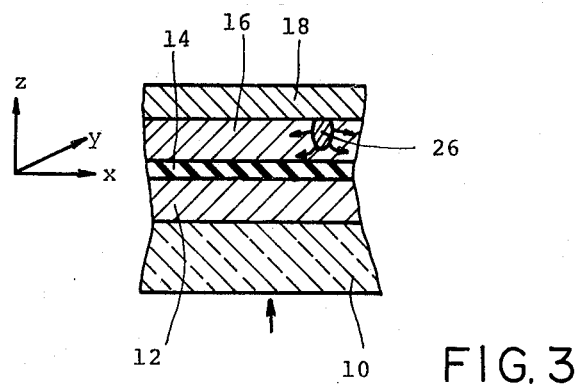
FIG. 3 is a partial sectional view of the reflective type liquid crystal display of FIG. 2.

The generation of pin holes is appreciably avoided by utilizing the aluminum oxide film 14 for the following reason. FIG. 3 particuraly shows the reflective type liquid crystal display of FIG. 2. Like elements are indicated by the like numerals in FIG. 2 The local cell reaction is caused between the transparent electrode 18 of indium oxide and the second reflective coating 16 of aluminum in accordance with the following chemical equation.

$$In_2O_3 + 2Al \rightarrow Al_2O_3 + 2I_n$$

The local cell of a reaction generating location 26 is first generated on the surface between the transparent electrode 18 and the second reflective coating 16 and extends toward the alminum oxide film 14. The aluminum oxide film 14 is more stable to the local cell reaction than the second reflective coating 16 of aluminum, whereby the local cell is inhibited from extending in the reactive direction along the Z-axis because of the reach to the aluminum oxide film 14 and thus proceeds in the reactive directions of the x-axis and the y-axis. The local cell is restricted inside the second reflective coating 16, thereby not extending toward the first reflective coating 12. The reaction generating location 26 is not caught by a viewer's sight because the operator sees only the first reflective coating 12 and the active surface of the display stands at an uniform mirror state.

As discussed above, although the reflective coating layers comprise the first and second reflective coatings 12, 16 and the aluminum oxide film 14 is arranged between them, more than two reflective coating layers can be applicable and a plurarity of the aluminum oxide films can space the reflective coaring layers, respectively. The incompletion of the first and second reflective coatings 12, 16 and the aluminum oxide film 14 require the stack arrangement thereof. The aluminum oxide film 14 can be replaced by an insulator coating made of magnesium fluoride, thorium fluoride, silicon dioxide, silicon monoxide, cerium oxide, magnesium oxide etc., through the use of vacuum deposition techniques, spraying, printing or painting techniques.

While particular representative embodiments and details have been shown for the purpose of illustrating the present invention, it will be apparent to those skilled in this art that various changes and modifications may be made without departing from the spirit or scope of the invention. Accordingly, the foregoing embodiments are not to be taken as delimiting examples but as exemplary structures of the invention defined in the claims.

What is claimed is:

1. A reflective type liquid crystal display comprising:
first and second support plates;
segmented reflective electrodes deposited on said first support plate;
first and second reflective coatings deposited on said second support plate in a region except the region corresponding to said segmented reflective electrodes;
a transparent electrode deposited on said second support plate and said second reflective coatings;
an intermediate layer of insulator material interposed between said first and second reflective coatings, said intermediate layer being capable of preventing a chemical reaction between said transparent electrode and said first reflective coating mounted on said second support plate; and
a liquid crystal composition filled between said first and second support plates.

2. The reflective type liquid crystal display set forth in claim 1, wherein said intermediate layer is made of one of the elements selected from the group consisting of aluminum oxide, magnesium fluoride, thorium fluoride, silicon dioxide, silicon monoxide, cerium oxide, and magnesium oxide.

3. The reflective type liquid crystal display set forth in claim 1, wherein said second support plate is a glass substrate.

* * * * *